United States Patent
Hindle et al.

(10) Patent No.: US 12,146,442 B2
(45) Date of Patent: Nov. 19, 2024

(54) DUAL-PURPOSE CONTROL MOMENT GYROSCOPE FOR VEHICLE CONTROL

(71) Applicant: HONEYWELL INTERNATIONAL INC., Charlotte, NC (US)

(72) Inventors: Timothy Hindle, Glendale, AZ (US); Toren Davis, Phoenix, AZ (US)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 126 days.

(21) Appl. No.: 17/805,163

(22) Filed: Jun. 2, 2022

(65) Prior Publication Data

US 2023/0139984 A1    May 4, 2023

Related U.S. Application Data

(60) Provisional application No. 63/273,059, filed on Oct. 28, 2021.

(51) Int. Cl.
| | |
|---|---|
| *F02C 7/32* | (2006.01) |
| *B60K 5/12* | (2006.01) |
| *B64D 41/00* | (2006.01) |
| *F02C 7/042* | (2006.01) |

(52) U.S. Cl.
CPC .............. *F02C 7/32* (2013.01); *B60K 5/1283* (2013.01); *B64D 41/00* (2013.01); *F02C 7/042* (2013.01); *B64D 2041/002* (2013.01); *F05D 2220/50* (2013.01); *F05D 2220/76* (2013.01); *F05D 2270/12* (2013.01); *F05D 2270/304* (2013.01); *F05D 2270/807* (2013.01)

(58) Field of Classification Search
CPC ....... B60K 5/1283; B64C 17/02; B64C 17/06; B64C 19/00; B64D 2041/002; B64D 27/00; B64D 27/26; B64D 2027/262; B64D 2027/264; B64D 2027/266; B64D 41/00; F02C 6/20; F02C 6/203; F02C 6/206; F02C 7/20; F02C 7/32; F05D 2220/50; F05D 2240/90; F05D 2270/12
See application file for complete search history.

(56) References Cited

U.S. PATENT DOCUMENTS

| | | |
|---|---|---|
| 2008/0223990 A1 | 9/2008 | Jackson et al. |
| 2020/0301446 A1* | 9/2020 | Leong .................. B64C 39/024 |
| 2023/0051515 A1* | 2/2023 | Baladi .................. B64D 27/24 |

* cited by examiner

*Primary Examiner* — Scott J Walthour
(74) *Attorney, Agent, or Firm* — Lorenz & Kopf LLP

(57) ABSTRACT

A vehicle includes a vehicle body, a vehicle power source, and an actuator. The vehicle power source includes a housing and a power generator. The housing is rotationally mounted on the vehicle body and is configured to rotate, relative to the vehicle body, about a first rotational axis. The power generator is rotationally mounted within the housing and is configured to rotate about a second rotational axis and generate power. The first rotational axis and the second rotational axis are orthogonally disposed. The actuator is coupled to the housing and is operable to selectively rotate the housing about the first rotational axis. By gimballing the rotating mass of the power source a gyroscopic torque can be applied to the vehicle improving its maneuverability.

17 Claims, 2 Drawing Sheets

DUAL-PURPOSE CONTROL MOMENT GYROSCOPE FOR VEHICLE CONTROL

CROSS-REFERENCE TO RELATED APPLICATION

This application claims priority to U.S. Provisional Patent Application No. 63/273,059, filed Oct. 28, 2021, the entire content of which is incorporated by reference herein.

TECHNICAL FIELD

The present disclosure generally relates to control moment gyroscopes (CMGs), and more particularly relates to CMGs that use the angular momentum of presently existing rotating machinery in a vehicle.

BACKGROUND

Historically, spacecraft have used CMGs to implement attitude control. Typically, a CMG consists of a large mass/inertia rotor that is spinning at a fixed speed (e.g., 6000 RPM or higher). The spinning rotor may be rotated with a gimbal (geared or direct drive motor), and the angular rate of the gimballed rotor produces a gyroscopic torque and transfers momentum to and from the spacecraft.

Over the past several years, the use of CMGs in non-space applications has been investigated and, in some cases, implemented. For example, CMGs have been implemented in seagoing vessels for roll-stabilization, and have been experimentally implemented in small, 2-wheel motor vehicles for roll axis control. While it would be desirable to implement CMGs in aircraft, since doing so would reduce or eliminate aerodynamic control effectors and associated control surfaces, CMG use in aircraft applications have not been pursued. This, in large part, is due to the significant mass that is required to implement a CMG.

Hence, there is a need for a way to implement CMGs in at least aircraft applications (as well as other non-space vehicles) that does not result in significant mass increase to the vehicle. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a vehicle includes a vehicle body, a vehicle power source, and an actuator. The vehicle power source includes a housing and a power generator. The housing is rotationally mounted on the vehicle body and is configured to rotate, relative to the vehicle body, about a first rotational axis. The power generator is rotationally mounted within the housing and is configured to rotate about a second rotational axis and generate power. The first rotational axis and the second rotational axis are orthogonally disposed. The actuator is coupled to the housing and is operable to selectively rotate the housing about the first rotational axis.

In another embodiment, a vehicle includes a vehicle body, a vehicle power source, a first flexible duct, a second flexible duct, and an actuator. The vehicle power source includes a housing and a power generator. The housing includes an inlet and an outlet and is rotationally mounted on the vehicle body and is configured to rotate, relative to the vehicle body, about a first rotational axis. The power generator is rotationally mounted within the housing and is configured to rotate about a second rotational axis and generate power. The first rotational axis and the second rotational axis are orthogonally disposed. The first flexible duct is coupled to the inlet, and the second flexible duct is coupled to the outlet. The actuator is coupled to the housing and is further coupled to receive actuator commands. The actuator is configured, in response to the actuator commands, to rotate the housing about the first rotational axis.

Furthermore, other desirable features and characteristics of the vehicle will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A CMG typically requires massive, large inertia rotors run at a relatively high speed to provide the desired angular momentum, that is subsequently gimbaled to produce a large gyroscopic torque and transfer momentum to and from the host vehicle. The rotors are typically the largest (and most massive) portion of the CMG. Given that rotating machines are (or can be) already included in aircraft powerplants (e.g., megawatt generator or jet engine), utilizing these rotating machines that are already present for the angular momentum of the CMG, eliminates the need for a dedicated (and heavy) CMG rotor.

The addition of a gimbal system to apply a desired angular rate to the turbomachine, along with flexible ducting on the inlet and outlet such that these do not change locations. CMGs in this application may be limited angle devices utilized to apply torques and transfer momentum to one or more axes. The simplest solution utilizes a scissored-pair (e.g., two generators or jet engines), where the rotating inertia of these devices serves as the CMG rotating inertia.

Torque (T) is generated as T='w'×'h' (where, 'w'=gimbal rate, 'h'=rotor momentum, x=vector cross product), per a standard CMG. The momentum of the pair is controlled via the momentum vectors of the two devices (e.g., the rotation axes).

Figure 1:
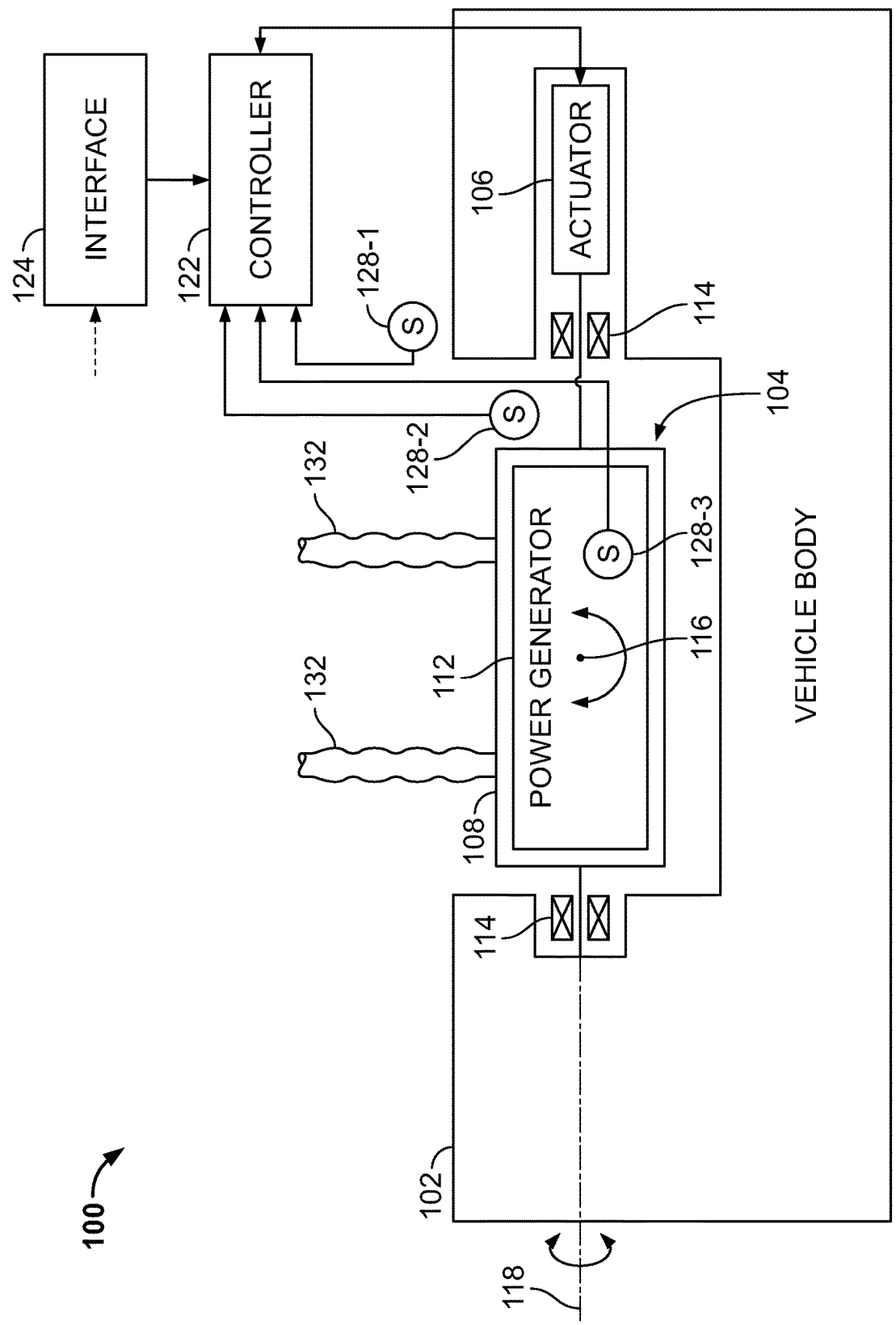
FIG. 1 is a functional block diagram of one embodiment of a vehicle with a dual-purpose control moment gyroscope (CMG)

Referring to FIG. 1, a functional block diagram of one embodiment of a vehicle 100 with a dual-purpose CMG is depicted and includes a vehicle body 102, a vehicle power source 104, and an actuator 106. The vehicle 100 may be any one of numerous vehicles that are non-spacecraft vehicles. For example, the vehicle 100 may be any one of numerous types of aircraft, any one of numerous types of terrestrial vehicles, or any one of numerous types of seagoing vessels or vehicles.

Figure 2:
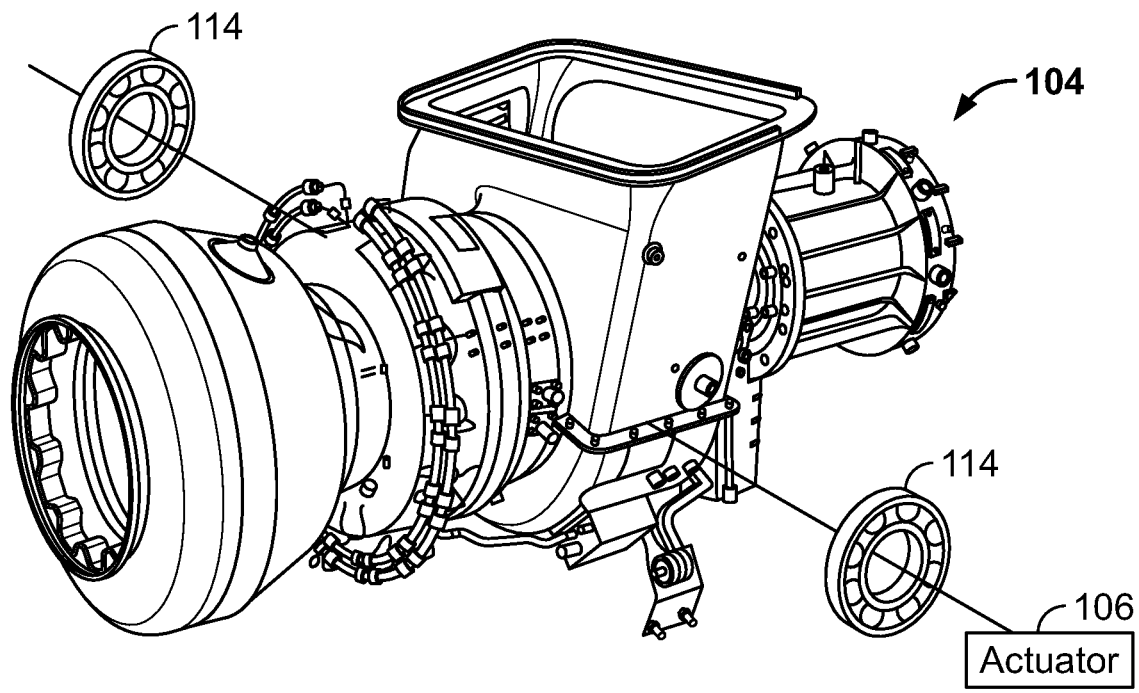
FIG. 2 depicts one embodiment of an auxiliary power unit that may be used to implement the dual-purpose CMG of FIG. 1.
Figure 3:
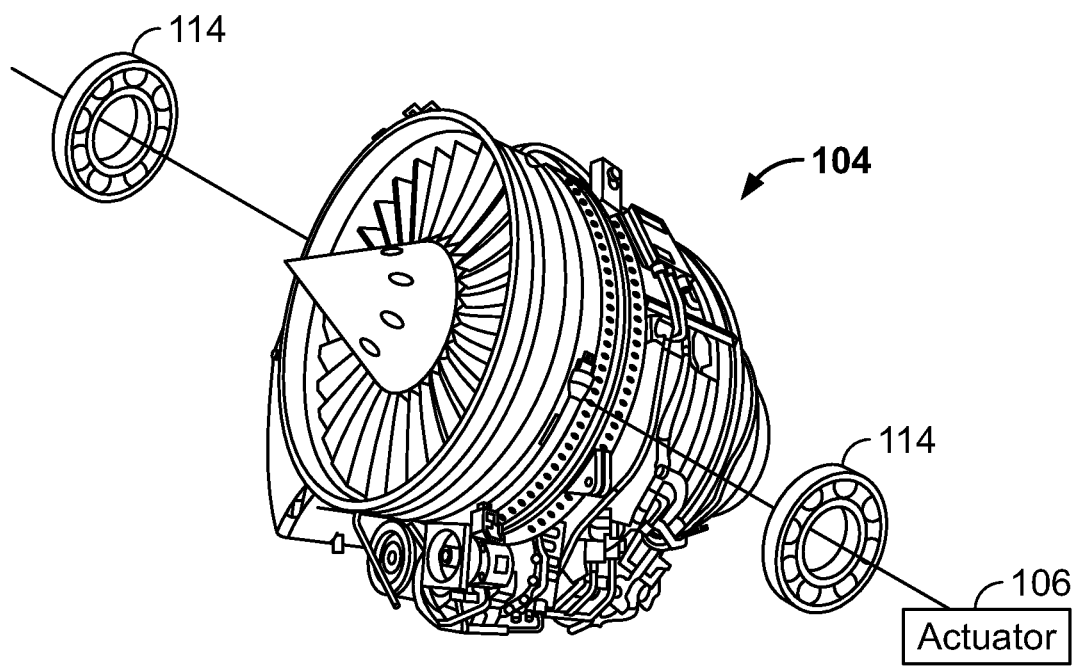
FIG. 3 depicts one embodiment of a gas turbine propulsion engine that may be used to implement the dual-purpose CMG of FIG. 1.

The vehicle power source 104 is disposed on or within the vehicle body and may be any one of numerous types of power sources. For example, it may be a gas turbine propulsion engine, an auxiliary power unit (APU), a generator, or any one of numerous other types power sources with a rotating mass. For completeness, two examples of potential vehicle power sources 104 are depicted in FIGS. 2 and 3. In particular, FIG. 2 depicts an APU and FIG. 3 depicts a gas turbine propulsion engine.

Returning to FIG. 1, regardless of how the vehicle power source 104 is specifically implemented, it includes a housing 108 and a power generator 112. The housing 108 is rotationally mounted on the vehicle body 102 via, for example, a set of bearings 114. The housing 108 is thus configured to rotate, relative to the vehicle body 102, about a first rotational axis 118. The power generator 112, which may be a Propulsion turbine engine, an internal combustion engine, an electrical generator whose primary mover could be a turbine or internal combustion engine, just to name a few, is rotationally mounted within the housing 108 and is configured to rotate about a second rotational axis 116 and generate power. As FIG. 1 depicts, the first rotational axis 118 and the second rotational axis 116 are orthogonally disposed.

The actuator 106 is coupled to the housing 108 and is operable to selectively rotate the housing 108 about the first rotational axis 118. As such, and as noted above, the rotating inertia of the vehicle power source 104, in which the power generator 112 is rotating about the second rotational axis 116, serves as the CMG rotating inertia. In the depicted embodiment, the actuator 106 is responsive to actuator commands it receives to rotate the housing 108 about the first rotational axis 118.

The actuator commands received by the actuator 106 are, at least in the depicted embodiment, supplied from a controller 122. The controller 122 is in operable communication with the actuator 106 configured to generate and supply the actuator commands More specifically, the controller 122 is coupled to receive input commands and is configured, in response to the input commands, to generate and supply the actuator commands.

As FIG. 1 further depicts, the controller 122 is coupled to receive the input commands from, for example, an interface 124. The interface 124 may vary depending, for example, on the type of vehicle 100. The user interface 124 can be one of many analog or digital electrical interfaces providing commands to the controller 122, as well as the desired feedback signals (sensors 128, internally calculated in controller 122, etc.) back to the source of the interface. It is most likely that the interface 124 is comprised of 2-way signals from the host vehicle's automatic control system. The controller 122, as already noted, is configured, in response to the input commands supplied from the interface 124, to generate and supply the actuator commands to the actuator 106.

The controller 122 is also coupled to receive input from one or more sensors 128. Although the number and types of sensors 128 may vary, the depicted embodiment includes three types of sensors 128, which include one or more attitude sensors 128-1 one or more rate sensors 128-2, and one or more rotational speed sensors 128-3. The one or more attitude sensors 128-1 are configured sense vehicle attitude. The one or more rate sensors 128-2 are configured to sense the rotational rate of the vehicle power sources 104 relative to the vehicle body 102. The one or more rotational speed sensors 128-3 are configured to sense the rotational speed of the power generator 112 relative to housing 108. The sensors 128 supply sensor signals, to the controller 122, that are representative of the parameters that each sensor senses. The controller 122 is configured, in response to the sensor signals, to control the gyroscopic torque supplied to the vehicle body 102 as commanded via interface 124, so that the gyroscopic torque is stable and within allowable limits.

Because the vehicle power source 104 is mounted to rotate relative to the vehicle body 102, the vehicle 100 may also be equipped with flexible ducting 132 on the inlet and outlet or input and output, depending on how the vehicle power source 104 is implemented. The flexible ducting 132 permits the angular rotation of the vehicle power source 104 over the required angular range of motion, which may be, for example, ±5-175 degrees.

Although the vehicle 100 in FIG. 1 is depicted with only one vehicle power source 104 and one associated actuator 106, it will be appreciated that the vehicle 100 could be implemented with two or more vehicle power sources 104 and associated actuators 106. Moreover, in some embodiments, a single actuator 106 could be used to rotate more than one vehicle power source 104. It is additionally noted that, although not depicted, power and signal transfer across the rotating interface between the vehicle body 102 and vehicle power source 104 is provided using any one of numerous known techniques such as, for example, flexible cable, or slip ring assemblies, as is known in the art.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces.

In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A vehicle, comprising:
   a vehicle body;
   a vehicle power source including a housing and a power generator, the housing rotationally mounted on the vehicle body and configured to rotate, relative to the vehicle body, about a first rotational axis, the power generator rotationally mounted within the housing and configured to rotate about a second rotational axis and generate power, wherein the first rotational axis and the second rotational axis are orthogonally disposed;
   a controller configured to receive data, generate actuator commands to control a gyroscopic torque supplied to the vehicle body based on the received data, and supply the actuator commands; and
   an actuator coupled to the housing and coupled to receive the actuator commands from the controller, the actuator configured, in response to the actuator commands, to rotate the housing about the first rotational axis and over an entire angular range of motion from +175 degrees to −175 degrees.

2. The vehicle of claim 1, wherein: the controller is configured to receive input commands as the data and is configured, in response to the input commands, to generate and supply the actuator commands.

3. The vehicle of claim 2, further comprising:
   a user interface in operable communication with the controller, the user interface adapted to receive input from a user and configured, in response to the user input, to generate and supply the input commands to the controller.

4. The vehicle of claim 1, further comprising:
one or more attitude sensors configured to sense vehicle attitude and supply an attitude sensor signal;
one or more rate sensors configured to sense rotational rate of the vehicle power source and supply a rate sensor signal; and
one or more rotational speed sensors configured to sense rotational speed of the power generator and supply a rotational speed sensor signal,
wherein the controller is coupled to receive each of the attitude sensor signal, the rate sensor signal, and the rotational speed sensor signal as the data.

5. The vehicle of claim 1, wherein the vehicle power source is configured as an auxiliary power unit.

6. The vehicle of claim 1, wherein the vehicle power source is configured as a propulsion engine for the vehicle.

7. The vehicle of claim 1, wherein the power generator is a turbine generator.

8. The vehicle of claim 1, wherein the power generator is an electrical generator.

9. A vehicle, comprising:
a vehicle body;
a vehicle power source including a housing and a power generator, the housing including an inlet and an outlet, the housing rotationally mounted on the vehicle body and configured to rotate, relative to the vehicle body, about a first rotational axis, the power generator rotationally mounted within the housing and configured to rotate about a second rotational axis and generate power, wherein the first rotational axis and the second rotational axis are orthogonally disposed;
a first flexible duct coupled to the inlet;
a second flexible duct coupled to the outlet;
a controller configured to receive data, generate actuator commands to control a gyroscopic torque supplied to the vehicle body based on the data, and supply the actuator commands; and
an actuator coupled to the housing and further coupled to receive the actuator commands from the controller, wherein the actuator is configured, in response to the actuator commands, to rotate the housing about the first rotational axis and over an entire angular range of motion from +175 degrees to −175 degrees.

10. The vehicle of claim 9, further comprising:
a controller in operable communication with the actuator and configured to generate and supply the actuator commands to the actuator.

11. The vehicle of claim 10, wherein: the controller is configured to receive input commands as the data and is configured, in response to the input commands, to generate and supply the actuator commands.

12. The vehicle of claim 11, further comprising:
a user interface in operable communication with the controller, the user interface adapted to receive input from a user and configured, in response to the user input, to generate and supply the input commands to the controller.

13. The vehicle of claim 10, further comprising:
one or more attitude sensors configured to sense vehicle attitude and supply an attitude sensor signal;
one or more rate sensors configured to sense rotational rate of the vehicle power source and supply a rate sensor signal; and
one or more rotational speed sensors configured to sense rotational speed of the power generator and supply a rotational speed sensor signal,
wherein the controller is coupled to receive each of the attitude sensor signal, the rate sensor signal, and the rotational speed sensor signal as the data.

14. The vehicle of claim 9, wherein the vehicle power source is configured as an auxiliary power unit.

15. The vehicle of claim 9, wherein the vehicle power source is configured as a propulsion engine for the vehicle.

16. The vehicle of claim 9, wherein the power generator is a turbine generator.

17. The vehicle of claim 9, wherein the power generator is an electrical generator.

\* \* \* \* \*